United States Patent

[11] 3,547,424

| [72] | Inventor | Richard E. Brown<br>5135 Montrose Road, Knoxville, Tenn. 37918 |
|---|---|---|
| [21] | Appl. No. | 758,299 |
| [22] | Filed | Sept. 9, 1968 |
| [45] | Patented | Dec. 15, 1970 |

[54] CIRCLE-CUTTING ATTACHMENT FOR FLAME CUTTERS
4 Claims, 6 Drawing Figs.

[52] U.S. Cl. ..................................................... 266/23;
        33/27; 77/77
[51] Int. Cl. ..................................................... B23k 7/10
[50] Field of Search ........................................... 266/23A,
        23B, 23D, 23L; 33/27C, 27D, 27F, 27K; 90/13.1;
        77/77; 145/121; 83/(Inquired)

[56] References Cited
UNITED STATES PATENTS

| 1,143,531 | 6/1915 | Giese.............................. | 33/27 |
| 1,582,033 | 4/1926 | Godfrey ......................... | 266/23 |
| 2,463,075 | 3/1949 | Young............................. | 33/27 |
| 2,494,532 | 1/1950 | Ager................................ | 266/23 |
| 3,388,901 | 6/1968 | Ferguson ....................... | 33/27 |

*Primary Examiner*—Gerald A. Dost
*Attorney*—Paul E. Hodges

ABSTRACT: An attachment for a motor-driven flame cutter for moving the cutting torch in a circular path. This attachment is outboard driven with reaction forces driving the torch mount, hence the torch.

INVENTOR
RICHARD E. BROWN
BY
Paul E. Hodger

PATENTED DEC 15 1970

INVENTOR
RICHARD E. BROWN

BY
Paul E. Hodges

INVENTOR
RICHARD E. BROWN

3,547,424

CIRCLE-CUTTING ATTACHMENT FOR FLAME CUTTERS

FIELD OF INVENTION

This invention deals with devices for cutting circles from planar stock employing a conventional cutting torch. More specifically, the present invention relates to attachments for flame cutting machines of the template-guided type, the attachment being adapted to replace the template and direct the cutting torch along a selectable circular path.

DESCRIPTION OF PRIOR ART

In one type of prior art flame cutting machine, the cutting torch is mounted on the outboard end of a swinging arm cantilevered over the stock. A variable-speed motor, also mounted on the arm, drives a magnetic shaft (at times referred to as a "roller" in the art) along the contour of a ferromagnetic template. The magnetic shaft and torch are vertically disposed, but spaced apart, with respect to each other and aligned coaxially. As the magnetic shaft follows the template, the arm supporting the torch is caused to swing along a path identical to the template contour. Thus the torch cuts a product having a contour identical to the template contour.

In the prior art, a circular template is required for cutting a circular product. Each diameter requires a separate template fabricated from a ferromagnetic material or provided with a ferromagnetic strip along the contour of the template so as to provide a surface against which the magnetic template-follower can attach itself. The great expense of fabricating and storing large numbers of such templates is apparent.

SUMMARY OF INVENTION

The present invention comprehends an attachment for template-guided-type flame cutters, such attachment being adapted to drive the cutting torch along a circular path of selectable diameter. Briefly, the present attachment comprises an arm, adjustable in length, pivotable within a horizontal plane, and pivotally driven from an outboard end thereof. A first gear arrangement disposed on the aforesaid outboard end of the arm serves as a transmission between a preexisting variable-speed motor and a drive shaft leading from the first gear arrangement to a second gear arrangement located at the pivot axis of the arm. This second gear arrangement is slidable with respect to the shaft so as to permit adjustment of the distance between the gear arrangements, hence the radius of the circle to be cut. Locking means is provided to releasable secure the second gear arrangement to a mount which is fixedly secured to the preexisting flame cutter superstructure. When the second gear arrangement is locked and the motor activated, a reaction force is established which pivots the arm. Since the motor and the torch are mounted on a preexisting free-swinging arm of the flame cutter, and the motor is connected directly to the outboard end of the pivoting arm of the attachment, the motor and torch are swung in a circular path. The diameter of this path is established by the radial distance between the outboard end of the attachment arm and its pivot point. When the second gear arrangement is not locked, the torch may be swung freely for setup purposes.

DESCRIPTION OF INVENTION

Figure 1:
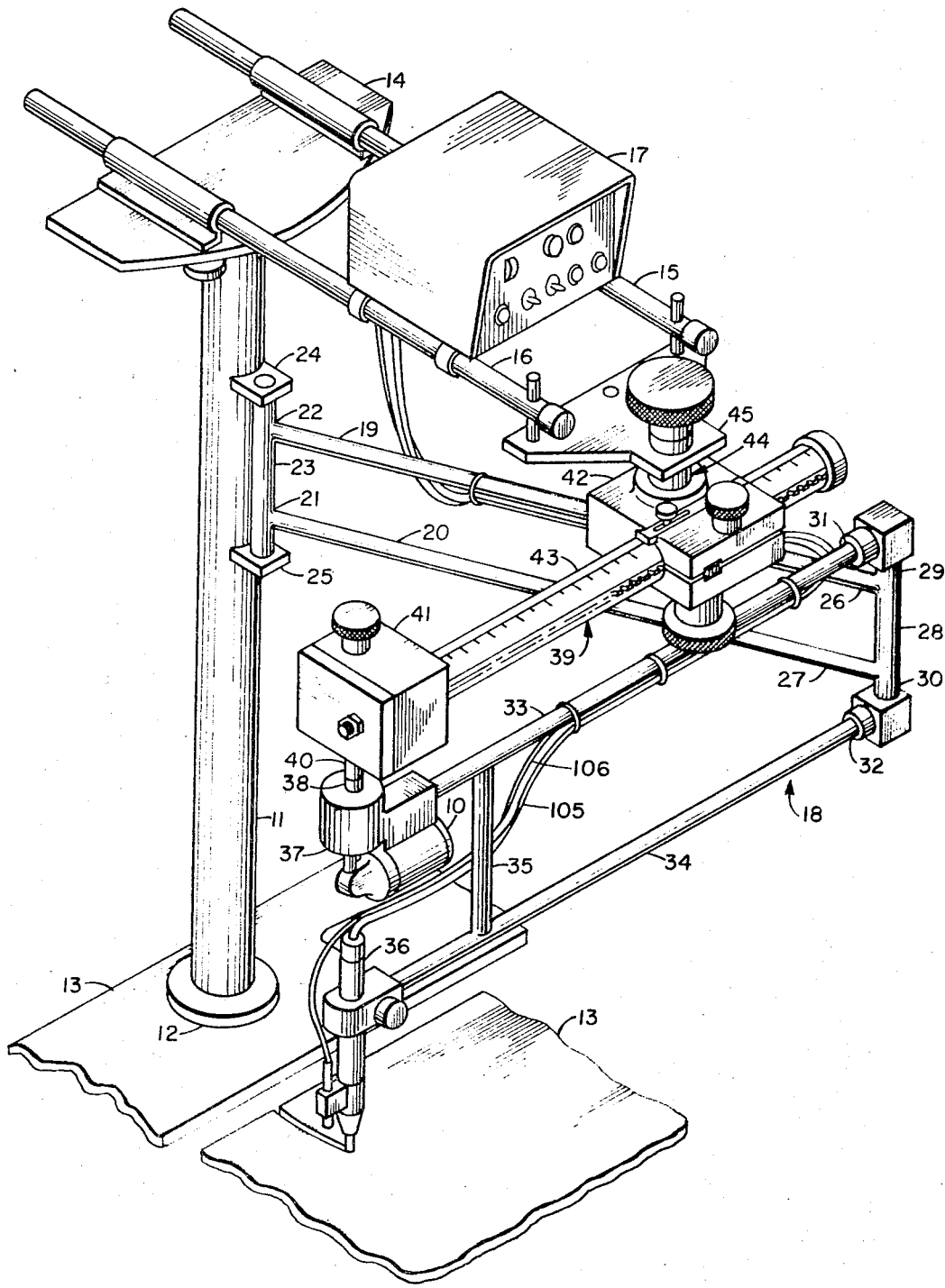
FIG. 1 is a schematic representation of a typical prior art flame cutter having the attachment of the present invention mounted thereon.

In FIG. 1, the circle-cutting attachment of the present invention is shown attached to a typical prior art flame cutter of the type wherein the cutting torch is moved slavishly along a path whose direction is determined by a template along which a magnetic shaft on motor 10 follows. One such prior art template-guided flame cutter is commercially available from Heath Engineering Company, P.O. Box 821, Fort Collins, Colorado. It will be recognized that in FIG. 1, the usual template has been removed and the attachment of the present invention substituted therefor.

Referring to FIG. 1, the prior art flame cutter comprises a vertically disposed column 11 whose pedestalled end 12 is adapted to be mounted on any appropriate surface such as a table 13. Atop column 11 there is mounted a plate 14 (usually slidably engaging the column) having a pair of arms 15 and 16 adjustably secured thereon and extending horizontally therefrom in a cantilevered attitude. Occasionally, these arms support, among other things, a control unit 17 for the cutter.

Intermediate of pedestal 12 and plate 14, the prior art flame cutter is provided with a carrier depicted generally at 18. This carrier comprises a first pair of parallel arms 19 and 20 spaced apart in a vertical plane, one end 21 and 22, respectively, of each arm being joined to a vertical member 23 pivotally secured to column 11 by brackets 24 and 25. Thus arms 19 and 20 extend horizontally from column 11. The outboard ends 26 and 27 of arms 19 and 20 are joined in spaced relation by a crossarm 28. The ends 29 and 30 of this crossarm extend past arms 19 and 20 to pivotally receive the ends 31 and 32 of a second pair of parallel arms 33 and 34. A crossarm 35 is provided near the outboard ends of arms 33 and 34 to assist in maintaining the arms in spaced apart and parallel relation. As may be visualized from FIG. 1, carrier 18 can be swung and pivoted freely within its horizontal plane.

A cutting torch 36 is carried on the outboard end of arm 34. Arm 33, at its outboard end, carries a variable-speed motor 10 and, usually, a speed reducer 37. Shaft 38 exiting the speed reducer, in the prior art, is magnetic and engages a template. In the present invention, shaft 38 connects the motor 10 and its speed reducer 37 to the present circle-cutting attachment depicted generally at 39.

As viewed in FIG. 1, the present circle-cutting attachment comprises a connector 40 engaging shaft 38, a first gear box 41, a second gear box 42 and a tubular radius arm 43 slidable within gear box 42. Shaft 44 serves to mount gear box 42 to adapter plate 45, which, in turn, is fixedly secured to the outboard ends of arms 15 and 16. It may now be visualized that any movement of gear box 41 will result in an identical slave movement of torch 36. In the present invention, movement of torch 36 is accomplished by driving gear box 41 along a circular path whose radius is a function of the linear distance between gear box 41 and gear box 42. The force which drives gear box 41 originates in motor 10, is transmitted through gear box 41, a shaft disposed within radius arm 43 (not visible in FIG. 1), and through gear box 42 where a reaction force is created, by means to be described hereinafter, and gear box 42 is rotated on shaft 44. By virtue of their physical relationship with respect to gear box 42, radius arm 43, gear box 41 and torch 36 on carrier 18 swing in a circular path about the center of shaft 44 when gear box 42 rotates.

The present attachment 39 is depicted in detail in FIGS. 2, 3, 4, 5 and 6. For connecting the attachment in driving engagement with the preexisting motor, the inventor provides an adapter 46 designed to receive, in one of its ends, the preexisting motor shaft 38 (FIG. 1) and in its other end a shaft 47 extending from gear box 41. Shaft 47 is rounded on its end to form the ball for a ball and socket type engagement between adapter 46 and shaft 47. Moreover, shaft 47 is slotted 48 to receive a pin 49 secured in the rounded end of shaft 47. This connection design provides positive rotational connection from the motor shaft 38 to shaft 47 as desired, and also allows easy disconnection from shaft 47 as will be discussed further hereinafter. In addition, this connection is not deleteriously affected by slight vertical and/or horizontal misalignments between adapter 46 and shaft 47.

Figure 2:
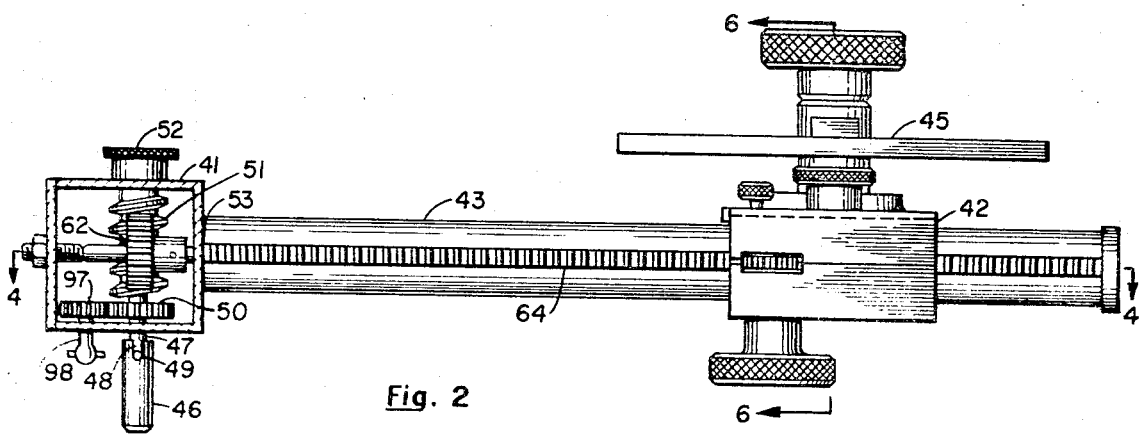
FIG. 2 is a side elevation view of the present invention.

As depicted in FIG. 2, shaft 47 is rotatably mounted in gear box 41 and has fixed thereon a spur gear 50 and a worm 51, said gears being disposed within gear box 41. One end of shaft 47 extends out of the top of gear box 41 to receive a knob 52 pinned thereto. Activation of motor 10 rotates shaft 47, worm 51 and spur gear 50. Alternatively, shaft 47, hence worm 51, can be rotated manually by means of knob 52.

Figure 4:
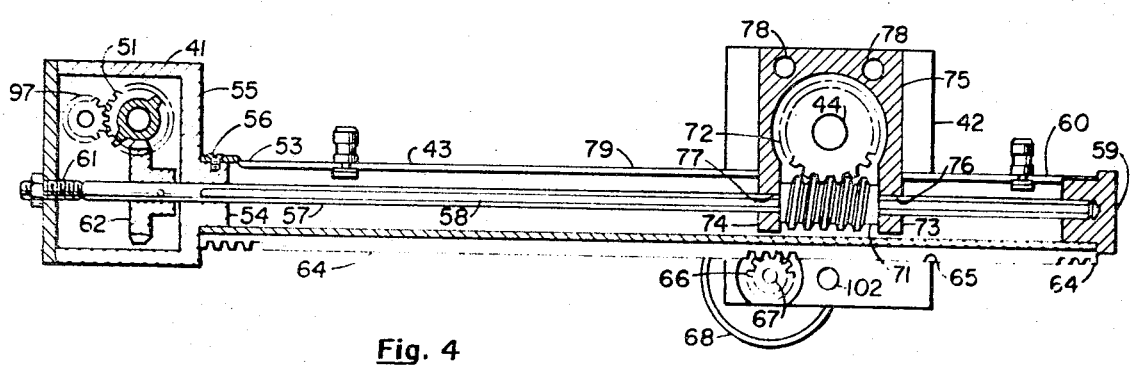
FIG. 4 is a top view, in section, of the present invention, taken along 4—4 of FIG. 2.

Gear box 41 is secured to the outboard end 53 of a tubular radius arm 43 slidably mounted in gear box 42 (see FIG. 4). A lug 54 projecting from side 55 of gear box 41 receives end 53 of the radius arm, the end being secured in position by screw 56.

A drive shaft 57 is provided within radius arm 43. This shaft is rotatably held at one end by a plug 59 in end 60 of the radius arm and at its other end in lug 54. The shaft extends through lug 54 into gear box 41 to terminate against a thrust bearing 61. A worm gear 62 pinned to that portion of shaft 57 extending into gear box 41 engages worm 51 to drivingly connect shaft 57 to motor 10. This shaft 57 is provided with a longitudinal flat 58 for purposes discussed hereinafter.

Figure 3:
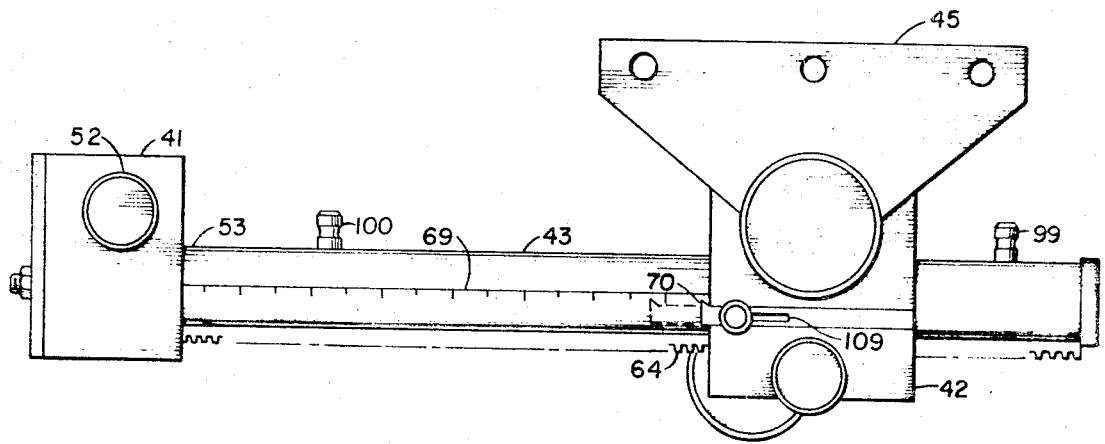
FIG. 3 is a top view of the present invention.
Figure 6:
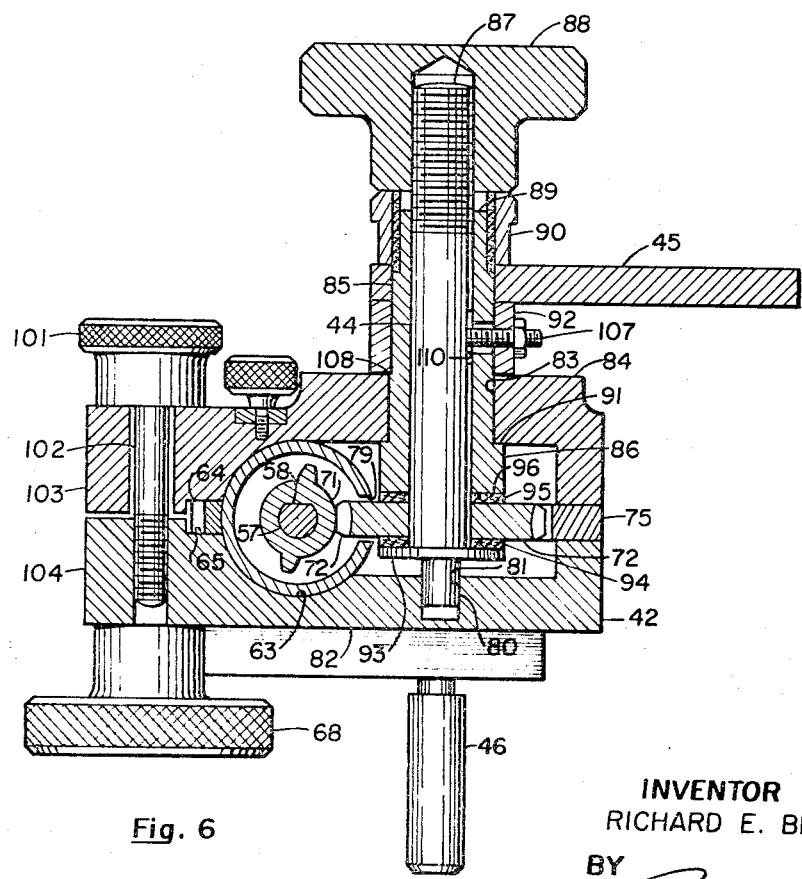

Radius arm 43 is slidably supported by gear box 42, the arm sliding within an appropriately-contoured slot 63 milled interiorly of gear box 42 (see FIG. 4 and 6). A rack 64, coextensive in length with arm 43, extends along one side and exteriorly of said arm. This rack also slides within a appropriate slot 65 formed interiorly of gear box 42. Pinion gear 66 pinned to shaft 67 mounted in gear box engages rack 64 in driving relation. Knob 68 secured to shaft 67 is employed to rotate gear 66, hence slide arm 43 within gear box 42. By this arrangement, the lineal distance between gear box 41 and gear box 42 may be selected. In FIG. 3, it may be seen that arm 43 is marked with indicia 69. An adjustable pointer 70 mounted on gear box 42 provides a visual reference point for judging the position of arm 43 with respect to gear box 42. Pointer 70 can be adjusted longitudinally with respect to arm 43 for effectively shifting the gear box 42 a selected increment, 1 inch for example, for purposes to be discussed hereinafter.

Figure 5:
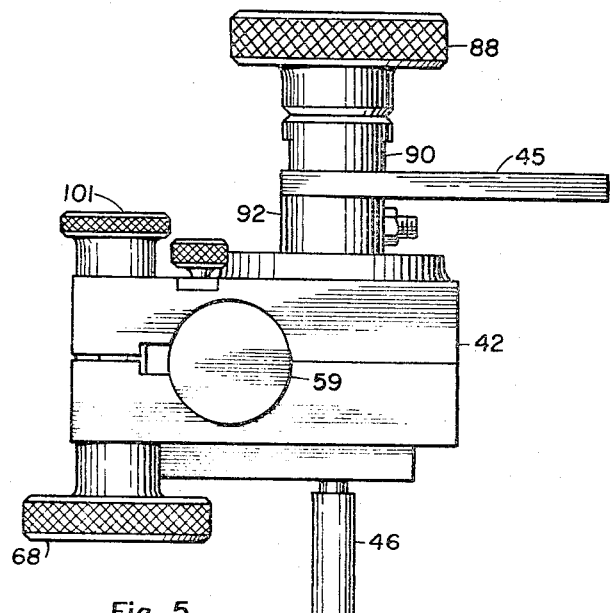
FIG. 5 is an end view of the present invention, and, FIG. 6 is a partial sectional view taken along 6—6 of FIG. 2.

Referring specifically to FIGS. 4 and 5, gear box 42 contains two gear elements: First, a worm 71 internally slotted to receive shaft 57 with its flat side 58, and second, a worm gear 72 releasably secured on shaft 44 and extending through a slot 79 in radius arm 43 to engage worm 71. It is preferred that these first and second gear elements be a worm and spur combination. It will be recognized that other gear combinations can be utilized, for example, two bevel gears or helical gears.

Worm 71 is disposed between the yoke arms 73 and 74 of a carrier 75 rigidly secured, as by screws 78 to gear box 42. Shafts 57 passes through openings 76 and 77 of these arms and through worm 71, this arrangement simultaneously maintaining worm 71 properly and rotatably disposed within gear box 42 during longitudinal movements of arms 43 and shaft 57 with respect to gear box 42.

One end 80 of shaft 44 is rotatably fitted in a bearing cavity 81 provided in the lower wall 82 of gear box 42. The shaft extends upwardly from wall 82, out through an opening 83 in the upper wall 84 of the gear box, and through an appropriate opening in mount 45. Sleeve 85, encompassing a portion of that part of shaft 44 residing within the gear box and a major portion of the shaft outside the gear box, serves in part as a bearing between shaft 44 and wall 84. This same sleeve likewise serves as a bearing between shaft 44 and mount 45. Shaft 44 is longitudinally slidable but not rotatable with respect to sleeve 85 said shaft being secured by locking screw 107 extending through spacer 92 and engages a slot 110 on shaft 44. That portion 86 of sleeve 85 within the gear box is greater in diameter than opening 83 thereby producing an annular shoulder 91 which bears against the interior side of wall 84 so as to preclude the sleeve from passing outwardly through opening 83. The wall of opening 83 also serves as a bearing surface for rotational movement of gear box 42 around shaft 44.

Shaft 44 is externally threaded at its uppermost end 87 to receive an internally threaded knob 88 thereon. Sleeve 85 terminates in an externally threaded portion 89 below knob 88. An internally threaded lock nut 90 engages the threaded portion 89 of sleeve 85 such that one end of the nut contacts mount 45 and its other end is contacted by knob 88. Thus, rotation of knob 88, while in contact with nut 90, produces an upward pull on shaft 44 with respect to mount 45.

An annular spacer 92 encircling that portion of sleeve 85 between mount 45 and wall 84 of the gear box maintains a fixed space relation between mount 45 and the gear box. A further annular shoulder 108 on shaft 44 at the point where the shaft exits wall 84 of the gear box is contacted by spacer 92. The fixed relationship of spacer 92 with respect to mount 45 and the gear box serves to further secure sleeve 85 against longitudinal movement.

Adjacent the lower end 80 thereof, shaft 44 is provided with an annular lug 93. A first friction washer 94 encircles the shaft above lug 93 and lies in contact therewith. Worm gear 72 is stacked on shaft 44 above washer 94, said gear being "free" on shaft 44 except as discussed hereinafter. A second friction washer 95 is provided between gear 72 and the flat end 96 of sleeve 85. As stated hereinbefore, tightening of knob 88 exerts an upward pull on shaft 44. When such a pull is exerted, lug 93 pushes friction washer 94, gear 72, and washer 95 together and up against the end 96 of the fixed sleeve 85. This action "locks" gear 72 to shaft 44. Since shaft 44 is nonrotatably held with respect to mount 45, when gear 72 is locked to shaft 44, this gear is also nonrotatable with respect to mount 45.

Gear box 42, however, is rotatable with respect to shaft 44 and mount 45. Thus when worm 71 is driven against the locked worm gear 72, a reaction force is created which drives worm 71 around gear 72 and, due to the mounting design for worm 71 within the gear box, thereby rotates gear box 42 and radius arm 43 about the vertical axis of shaft 44.

Alternatively, washers having notches or serrations on their flat sides, with mating notches or serrations on gear 72, could be substituted for the friction-type washers 94 and 95. The friction washers are preferred for their infinite adjustability, hence the maximum capability afforded in choosing the starting point for the arcuate swing of the cutting torch.

It is also of major importance to note that the aforedescribed "locking" concept for gear 72 permits an operator to free the radius arm for manual rotation during setup operations. As is well known in the art, prior to commencing the actual burning of the workpiece, the operator swings the torch over the workpiece and along the intended circular path. This operation insures that, (1) the torch will never approach too closely to the edge of the workpiece with consequent loss of preheat, and, (2) the intended cut will result in optimum utilization of the workpiece. In the present invention, the operator need only loosen knob 88 in order to free the radius arm and permit manual rotation of the torch. Following setup, positive locking of gear 72, hence the radius arm, is effected by merely tightening knob 88.

The speed of travel of the cutting torch along its circular path is critical to a successful cutting operation. Rough edges on the product, "saw cuts", excessive melting, and other like deleterious results arise when the torch speed varies. In the present invention, the force which drives the torch along its path is applied at the outboard end of the radius arm. This concept reduces the effect on the torch speed of motor speed changes, slack in gears and other components, etc. by reason of the fact that relatively great irregularities in speed arising at the motor produce only slight angular irregularities at the pivot point of the radius arm (e.g. the axis of shaft 44), hence only slight irregularities in torch speed. In the same manner, the "outboard-drive" appropriate provides an operator with a much more sensitive control over torch travel than is possible when angular motion is obtained by driving through the pivot shaft 44.

Referring now to FIG. 3, indicia 69 and a pointer 70 are provided on radius arm 43 for purposes of indicating the linear distance between gear box 41 and gear box 42, hence the linear distance between the axis of shaft 44 and the axis of shaft 47. Since the axis of shaft 47 is coincident with the axis of torch 36, the indicia serve the primary purpose of indicating the radius of the circular path to be traveled by the torch. For repetitous settings of the radius arm, such as when cutting "-donut"-shaped products (that is, cutting inside and outside perimeters), appropriate stops 99 and 100 fitted in slot 79 on arm 43 provide a rapid means of repetitiously adjusting the radius arm to cause the torch to follow an appropriate path.

Certain cutting operations require extraordinarily slow torch speeds. The present invention incorporates a second shaft 98 (See FIG. 2), substantially identical in construction to shaft 47, carrying a spur gear 97 which meshes with gear 50 on shaft 47. Gear 97 possesses fewer teeth than gear 50. Thus when motor 10 is connected to shaft 98, the gear ratio between gear 97 and gear 50 functions to reduce the speed of torch travel as compared to the torch speed when shaft 47 is connected to motor 10, thereby establishing two speed ranges from which an operator may select.

Shaft 98 is a short radial distance farther from the axis of shaft 44 than is shaft 47. To compensate for this additional distance in setting the radius arm in accordance with indicia 69, pointer is slotted 109 to permit it to be moved a distance equal to the distance between shafts 47 and 98. By this arrangement, the indicia are made to reflect the true radius of the path to be traveled by the torch.

I claim:

1. A circle-cutting attachment for flame cutters of the type wherein the torch is carried on a cantilevered and jointed boom movable freely within its horizontal plane and having motor means associated with said boom, said attachment comprising, in combination with said flame cutter:

mount means adapted to secure said attachment to said flame cutter;

housing means;

arm means slidably received in said housing means;

first gear means disposed on one end of said arm means;

second gear means mounted within said housing means and including at least first and second gear elements;

first shaft means rotatably supporting said first gear element of said second gear means and further rotatably supporting said housing means with respect to said mount means;

second shaft means drivingly connecting said first gear means and said second gear element of said second gear means, said second gear element being slidable on said second shaft means;

connector means connecting said motor means to said first gear means in driving relation therewith; and means releasably securing said first gear element to said first shaft means, whereby transmission of a torque force from said motor means to said first gear element releasably secured on said first shaft means creates a reaction force to rotate said housing means, hence said arm means, when said gear element is fixedly secured to said first shaft means.

2. The invention of claim 1 wherein said arm means is hollow and said second shaft means is disposed within said hollow arm.

3. In combination with the invention of claim 1, indicia on said arm means for visually portraying the radial distance between said first and second gear means.

4. The invention of claim 1 wherein said first gear element is a worm gear and said second gear element is a worm.